United States Patent
Autenrieth

(10) Patent No.: US 6,521,364 B1
(45) Date of Patent: Feb. 18, 2003

(54) FLAME COLORANT ADDITIVE FOR METHANOL FOR THE OPERATION OF A FUEL CELL SYSTEM

(75) Inventor: Rainer Autenrieth, Grossbottwar (DE)

(73) Assignee: Ballard Power Systems AG, Kirchheim/Teck-Nabern (DE)

(*) Notice: Subject to any disclaimer, the term of this patent is extended or adjusted under 35 U.S.C. 154(b) by 6 days.

(21) Appl. No.: 09/716,999

(22) Filed: Nov. 22, 2000

(30) Foreign Application Priority Data

Nov. 24, 1999 (DE) .......................... 199 56 375

(51) Int. Cl.$^7$ ................................. H01M 8/00
(52) U.S. Cl. ............................. 429/12; 429/13; 429/51; 429/53
(58) Field of Search .................. 429/12, 13; 44/51, 44/53

(56) References Cited

U.S. PATENT DOCUMENTS

| | | | |
|---|---|---|---|
| 4,220,729 A | * | 9/1980 | Uchida et al. ............... 521/124 |
| 4,253,987 A | * | 3/1981 | Fiato ........................... 502/161 |
| 4,932,979 A | * | 6/1990 | Thrasher et al. ............... 44/379 |

FOREIGN PATENT DOCUMENTS

| | | |
|---|---|---|
| DE | 2 222 939 | 11/1972 |
| GB | 1 368 871 | 10/1974 |
| JP | 63-58021 | 3/1988 |
| JP | 63-215795 | 9/1988 |
| JP | 01245093 A * | 9/1989 |
| JP | 1-245093 | 9/1989 |
| JP | 3-152193 | 6/1991 |
| WO | WO 90/03421 | 4/1990 |
| WO | WO 00/21772 | 4/2000 |
| WO | WO 00/53697 | 9/2000 |
| WO | WO 00/59751 | 10/2000 |

OTHER PUBLICATIONS

Sigma–Aldrich Catalog.*

* cited by examiner

*Primary Examiner*—Carol Chaney
*Assistant Examiner*—Dah-Wei D. Yuan
(74) *Attorney, Agent, or Firm*—Crowell & Moring LLP

(57) ABSTRACT

A flame colorant additive for methanol for the operation of a fuel cell system includes at least one of (1) NaCl; (2) an organic compound of an element of the first principal group or of the second principal group of the periodic table of elements; and/or (3) an organic compound of an element of the third secondary group or of the ninth secondary group of the periodic table of elements.

10 Claims, No Drawings

FLAME COLORANT ADDITIVE FOR METHANOL FOR THE OPERATION OF A FUEL CELL SYSTEM

BACKGROUND AND SUMMARY OF INVENTION

This application claims the priority of 199 56 375.6, filed Nov. 24, 1999, the disclosure of which is expressly incorporated by reference herein.

The present invention relates to a flame colorant additive for methanol for the operation of a fuel cell system.

It is known to use methanol as a hydrogen source for the operation of fuel cell systems. Since methanol burns substantially colorless, additives are desirable, especially in the use of fuel cell systems in motor vehicles.

U.S. Pat. No. 4,932,979 discloses the use of flame colorant additives. Accordingly, methanol is treated with flame colorant additives and lubricants which permit the complete combustion of the methanol with minimal residues and low pollutant content. In the reformation of methanol, and also in other processes in the fuel cell system, however, catalysts are used which are adversely affected by even small amounts of foreign substances. For this reason, only methanol of a very high purity is used in fuel cell systems.

PCT/EP/99/07662 discloses providing methanol with an additive from a reservoir, which in case of an accident will cause flame coloration. Thus the catalysts used in the fuel cell system will not necessarily be adversely affected by additives in the methanol, since the addition is made only in case of an accident, it being assumed that the damage due to the accident is greater than catalysts contaminated or rendered useless by the accident.

The problem of the present invention is to provide a hydrogen-containing fuel for fuel cells which is suitable for the operation of fuel-cell vehicles and which has a sufficient flame coloration.

According to the present invention, a hydrogen carrier, preferably methanol, is used as a hydrogen-containing fuel treated with a catalyst-neutral flame colorant additive.

Preferably an acetate, and with special preference sodium acetate, is added. This additive produces a definite flame coloring. At the same time, no negative effect on the catalyst materials is to be seen, especially the catalysts used in the reforming of methanol. This permits the addition of the flame colorant additive during normal operation.

Further advantages and embodiments of the invention will appear from the additional claims and the description.

DETAILED DESCRIPTION OF INVENTION

With the addition of flame coloring additives, methanol when burned shows a definite flame color. It is appropriate to use flame coloring metals (e.g., those of the first and second main group and of the 3rd and 9th secondary group of the Periodic Table of Elements). Salts of these substances can be used with preference. Especially advantageous are organic compounds of the substances, especially acetates.

Especially preferred are compounds with alkali or alkaline earth metals. To protect the catalyst, especially the catalyst of the reforming unit of the fuel cell system, a very low concentration of the additive is desirable, (e.g., less than 10 ppm, while a high concentration, preferably greater than 1000 ppm, provides for a clear flame coloration). The flame coloring metal components of compounds with metals of the above main groups and sub-groups are substantially harmless to catalysts. While chlorides, for example, adversely affect the catalyst, at least in high concentration ranges around 1000 ppm, compounds with organically bound metals are much less harmful.

It appears that especially sodium acetate as an additive in methanol produces virtually no catalyst damaging action, while the flame coloring properties are well pronounced. Advantageously, the additive can be used in a range of 1–1000 ppm without observing any appreciable damage.

Besides sodium acetate, sodium chloride also appears as a desirable additive. The allowable range of concentration, however, is less than in the organic compound. The use of cobalt acetate is also advantageous.

One preferred flame coloring additive consists of sodium acetate. Another preferred flame coloring additive consists of sodium chloride. Another preferred flame coloring additive consists of a mixture of sodium chloride and/or organically bound elements of the first and second main group and of the third and ninth secondary group, especially of acetates of these elements.

The advantage of the flame colorant additive of the present invention is that, despite the sensitivity of the catalysts in the fuel cell system, especially those of the reforming catalyst, the hydrogen-containing fuel can be provided with a flame colorant additive in normal operation as well.

Thus the safety of the fuel cell system is improved without greater operating expense.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:
   a hydrocarbon fuel;
   a catalyst; and
   a flame colorant additive comprising sodium chloride.

2. A fuel cell system according to claim 1 comprising 10 to 1000 ppm of the flame colorant additive.

3. A fuel cell system, comprising:
   a hydrocarbon fuel;
   a catalyst; and
   a flame colorant additive comprising at least one organic compound of an element of the first principal group or of the second principal group of the periodic table of elements.

4. A fuel cell system according to claim 3, wherein the flame colorant additive is an acetate.

5. A fuel cell system according to claim 3 comprising 10 to 1000 ppm of the flame colorant additive.

6. A fuel cell system, comprising:
   a hydrocarbon fuel;
   a catalyst; and
   a flame colorant additive comprising at least one organic compound of an element of the third secondary group or of the ninth secondary group of the periodic table of elements.

7. A fuel cell system according to claim 6, wherein the flame colorant additive is an acetate.

8. A fuel cell system according to claim 7, wherein the flame colorant additive is cobalt acetate.

9. A fuel cell system according to claim 6, wherein the flame colorant additive is sodium acetate.

10. A fuel cell system according to claim 6 comprising 10 to 1000 ppm of the flame colorant additive.

* * * * *